United States Patent [19]

Robinson

[11] Patent Number: 5,049,439

[45] Date of Patent: Sep. 17, 1991

[54] THERMOFORMABLE ARTICLE

[75] Inventor: Leonard W. Robinson, Trenton, Mich.

[73] Assignee: Fibre Converters, Inc., Three Rivers, Mich.

[21] Appl. No.: 528,969

[22] Filed: May 25, 1990

[51] Int. Cl.⁵ .............................................. B32B 3/26
[52] U.S. Cl. .................................. 428/286; 428/287; 428/317.1; 428/317.9; 428/319.7
[58] Field of Search ............... 428/317.9, 319.7, 317.1, 428/317.7, 286, 287

[56] References Cited

U.S. PATENT DOCUMENTS 4,695,501 9/1987 Robinson ..................... 428/317.1

FOREIGN PATENT DOCUMENTS 76888 4/1983 European Pat. Off. ......... 428/317.9
44-469 1/1969 Japan ................................ 428/317.9

Primary Examiner—William J. Van Balen
Attorney, Agent, or Firm—Flynn, Thiel, Boutell & Tanis

[57] ABSTRACT

A thermoformable composite article comprising a thermoformable foam core which is reinforced with fibers.

10 Claims, 1 Drawing Sheet

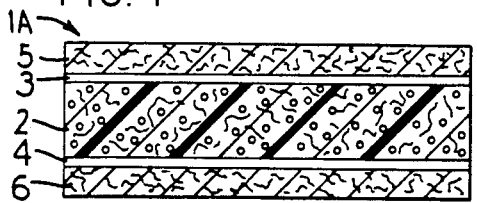
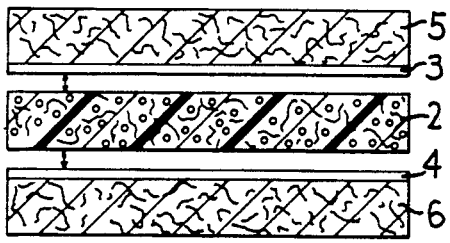
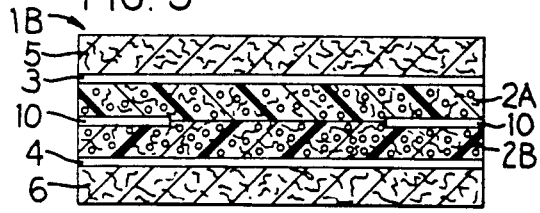
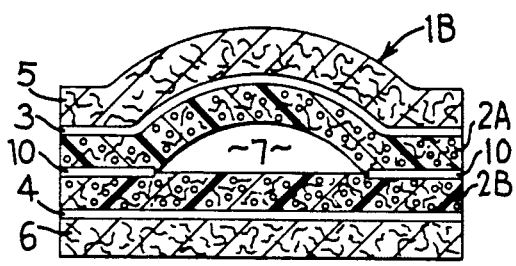
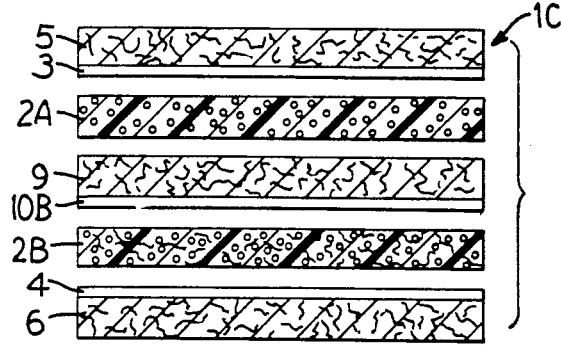
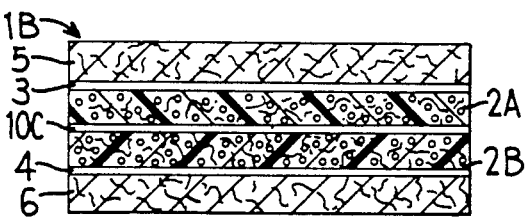
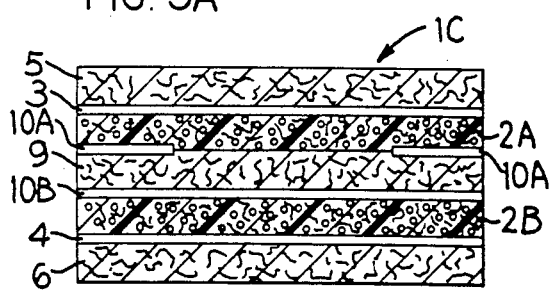
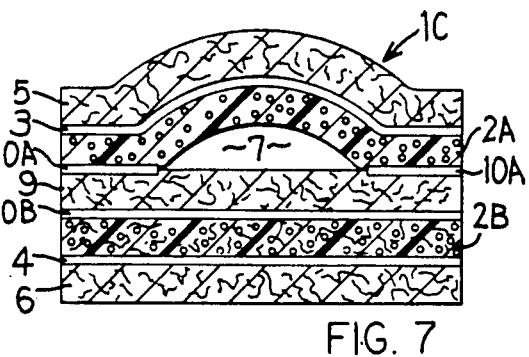
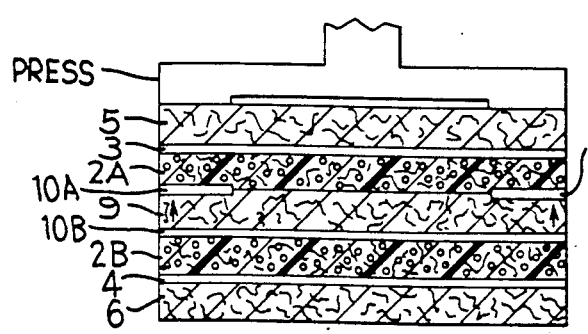

THERMOFORMABLE ARTICLE

FIELD OF THE INVENTION

This invention relates to a thermoformable composite article, particularly a panel capable of being three-dimensionally contoured for use in an automobile headliner. The thermoformable composite article comprises a pair of fabric layers superposed on and adhered to opposite sides of a foam core made of styrene/maleic anhydride copolymer synthetic resin reinforced with randomly distributed, relatively short, discrete, discontinuous fibers, preferably chopped fiberglass fibers. At least one of the fabric layers is a nonwoven fabric impregnated with a synthetic resin.

BACKGROUND OF THE INVENTION

Various materials have been used as automobile headliners. My U.S. Pat. No. 4,695,501 discloses thermoformable composite panels comprised of a core made of one or more layers of synthetic resin foam, for example, styrene/maleic anhydride copolymer synthetic resin. The core is covered on its opposite surfaces by fabric layers which are bonded to the core layers by adhesive layers. At least one of the fabric layers is impregnated with a thermoplastic or thermosetting resin.

Automobile headliners must be able to withstand elevated temperatures without sagging or buckling. The automobile headliner panels of U.S. Pat. No. 4,695,501 are effective to withstand temperatures of up to about 200° F., without significant sagging or buckling.

I have discovered that the heat resistance of the panels can be improved by incorporating fibers, especially chopped fiberglass strands, in the foam core, particularly a styrene/maleic anhydride copolymer synthetic resin foam core. Although many polymers having higher heat resistance than styrene/maleic anhydride copolymers are known, they are more difficult to thermoform and articles made therefrom in three dimensionally contoured configurations tend to be objectionably stiff or boardy and they exhibit reduced sound-absorbing properties. Surprisingly, and contrary to expectations, I have found that the incorporation of fibers, especially randomly distributed, short, discrete, discontinuous glass fibers, in the foamed styrene/maleic anhydride copolymer synthetic resin does not detrimentally affect the molding of the foam core, the thermoforming of the thermoformable composite panel made using that core or the sound-absorbing properties of the finished panel.

SUMMARY OF THE INVENTION

The thermoformable composite article of the present invention comprises a relatively stiff, thermoformable, synthetic resin, foam core containing uniformly and randomly distributed therein from about 5 to about 30 percent by weight of relatively short, discrete, discontinuous, reinforcing fibers. The foam core has a Vicat softening point of at least about 240° F. A pair of fabric layers are adhesively bonded to the foam core. At least one of the fabric layers is a nonwoven fabric which is impregnated with a thermoplastic or uncrosslinked thermosetting resin.

The synthetic resin foam used to form the core of the thermoformable composite article must be thermoformable at an elevated temperature above the softening point of the resin, but below the melting point thereof. The thermoplastic or thermosetting resin impregnated in one or both of the nonwoven fabric layers renders the impregnated, nonwoven, fabric layer thermoformable.

The thermoformable composite article according to the invention exhibits a greater resistance to high temperatures above about 200° F., as well as improved fatigue, tensile and flexural strength properties. At the same time, the thermoformable composite article according to the invention exhibits a reduced mold shrinkage and a high sound deadening ability.

BRIEF DESCRIPTION OF THE DRAWINGS

In the accompanying drawings:

FIG. 1 is a cross-sectional view of a first embodiment of a thermoformable composite article according to the present invention, FIG. 2 is a cross-sectional view of the components used to form the composite article shown in FIG. 1, FIG. 3 is a cross-sectional view of the thermoformable composite article according to a second embodiment of the invention, FIG. 3a is a view like FIG. 3 and showing a modification in which a continuous adhesive layer is provided between the foam core layers, FIG. 4 is a cross-sectional view of the thermoformable composite article shown in FIG. 3, after the chambers have been formed therein, FIG. 5a is a cross-sectional view of the components used to make the thermoformable composite article according to a third embodiment of the invention, FIG. 5b is a view like FIG. 5a and illustrating the step of transferring a portion of the adhesive from one side of the porous fabric layer to the other side thereof, FIG. 6 is a cross-sectional view of the composite article according to the third embodiment of the present invention, and FIG. 7 is a cross-sectional view of the composite article shown in FIG. 6 after the formation of chambers or resonator cavities therein.

The foregoing drawings are not to scale. However, FIGS. 1 and 2 are substantially proportional and show the changes in the thicknesses of the layers that occur when the thermoformable composite article is assembled.

DETAILED DESCRIPTION

FIG. 1 illustrates a first embodiment of the present invention. The composite article 1A shown in FIG. 1 comprises a synthetic resin foam core 2 containing relatively short, reinforcing fibers randomly and substantially uniformly distributed therein. The upper and lower surfaces of the core 2 are in contact with and adhered to a pair of adhesive layers 3 and 4, respectively. The adhesive layers 3 and 4 aid in adhering fabric layers 5 and 6, respectively, to the opposite faces of the foam core 2. At least one of the fabric layers 5 and 6 is made of a nonwoven fabric impregnated with a thermoplastic or uncrosslinked thermosetting resin. In the embodiment shown in FIG. 1, both layers 5 and 6 are made of such a nonwoven fabric impregnated with a thermoplastic or uncrosslinked thermosetting resin.

Selection of appropriate materials for the layers of the composite articles, according to the present invention, is essential to achieve a satisfactory thermoformable composite article. The foam core 2 can be made of any well-known synthetic resin capable of forming a thermoformable foam having a Vicat softening point of at least about 240° F. or higher. Styrene/maleic anhydride copolymers are particularly preferred for use as the foam-forming synthetic resin because these copolymers have relatively high softening and melting points. Conventional additives, such as foam controlling agents, pigments, wetting agents, bases to lower the pH, thickeners, resins such as melamine-formaldehyde resin and fire retardants, can be incorporated into the foam-forming synthetic resin.

The foam core 2 contains from about 5 to about 30 percent by weight, preferably from about 10 to 20 percent by weight, based on the total weight of said foam core, of relatively short, discrete, discontinuous, reinforcing fibers randomly and substantially uniformly distributed therein. The fibers are preferably from about 1/16 to about ½ inches long. The fibers can be synthetic fibers, cellulose fibers and other fibers of animal or vegetable origin. It is preferred, however, to use fiberglass staple fibers. The fibers are not in the form of a fabric or mat, but rather, are used as discrete fibers.

The foam core 2 is usually formed by a two-stage process. The first stage is a conventional extrusion process used for molding styrene/maleic anhydride copolymers in order to form a sheet- or board-like extruded product. A blowing agent is incorporated into the initially formed extruded product so that the extruded product is expandable. An air field can be used to form an integral skin on the extruded product. Formation of the foam core 2 is completed in the second stage by effecting expansion of the extruded product.

FIG. 2 illustrates the same components as shown in FIG. 1, before these components are bonded together to form the composite article. According to the preferred method of the present invention, one or both of the fabric layers 5 and 6 are previously impregnated with a thermoplastic or uncrosslinked thermosetting resin and are then coated on one face thereof with a heat-activated adhesive whereby to form the adhesive layers 3 and 4 which are integral with the fabric layers 5 and 6, respectively. The foam core 2 is then interposed between the adhesive-coated faces of the fabric layers 5 and 6, as shown in FIG. 2, and the resulting assembly is pressed together under heat and pressure to bond the layers together by means of the adhesive and form the unitary composite article. During this laminating process, the foam core 2 preferably undergoes expansion so that its thickness increases up to 100 percent of its original dimension. Thus, comparing FIG. 2 with FIG. 1, it will be observed that the thickness of the core layer 2 of the unitary composite article (FIG. 1) is greater than the thickness of the core layer 2 prior to forming the composite article (FIG. 2). This expansion causes the cell size of the foam core 2 to increase and its density correspondingly to decrease. The bonding step is conducted at an elevated temperature sufficient to effect bonding of the adhesive layers 3 and 4 to the foam core 2 and to cause foaming of the foam core 2.

If a thermosetting resin is used as the resin for impregnating the fabric layers 5 and 6, the temperature employed in the bonding step is not so high as to completely thermoset this resin; rather, the resin is maintained as a B-stage resin; Thus, by heating the thus-formed composite article to a still higher temperature at a later time, thermoforming can be carried out wherein the resin impregnating the fabric layers 5 and 6 undergoes crosslinking and is thereby completely thermoset to form a C-stage resin.

In a modification of the foregoing process, the adhesive layers 3 and 4 can be formed on the opposite upper and lower faces of the foam core 2 prior to the bonding step, rather than on the fabric layers 5 and 6.

Commercially available fiberglass-reinforced, styrene/maleic anhydride copolymers can be used to make the foam core 2. The following Dylark resins produced by Arco Polymers, Inc., Philadelphia, Pennsylvania, are suitable: Dylark 232-F10 (10 weight percent fiberglass), Dylark 232-F20 (20 weight percent fiberglass), Dylark 238-F20A (20 weight percent fiberglass), Dylark 240-F10 (10 weight percent fiberglass), Dylark 240-F20 (20 weight percent fiber-glass), Dylark 250-F10 (10 weight percent fiberglass) and Dylark 250-F20 (20 weight percent fiberglass).

Styrene/maleic anhydride copolymers usually contain from about 2 to about 15 percent by weight of maleic anhydride, based on the weight of the copolymer. For greater impact strength, the copolymer can also contain from about 3 to about 12 percent by weight of polybutadiene rubber. When a fiberglass-reinforced styrene/maleic anhydride copolymer is used as the synthetic resin foam core 2, the step of bonding the fabric layers 5 and 6 to the core 2 is carried out at a temperature in the range of 245° to 265° F. and at a pressure of about 25 to 50 pounds per square The assembly of the fabric layers 5, 6 and foam core 2 is then bump-pressed for about 8 to 12 seconds in order to remove moisture therefrom. The resulting composite article is then allowed to cool.

The fiberglass-reinforced foam core 2 is preferably a relatively rigid structural foam, as determined by the fact that it would rupture or break if it were to be substantially bent, particularly if it were to be bent around a 2.5 cm mandrel at a rate of one lap per 5 seconds at 15° to 25° C. The foam core 2 has a density in the range of about 3.5 to 7.5 pounds per cubic foot after expansion. The foam core 2 generally has a thickness in the range of 0.05 to 0.5 inches, preferably 0.1 to 0.3 inches, after expansion. When the foam core is made of a fiberglass-reinforced styrene/maleic anhydride copolymer, the most desirable density is from 5 to 5.5 pounds per cubic foot after expansion. The cell size of the foam core 2 is regulated during the expansion step. An average of 5 to 10 cells per 0.08 inch across the width of the foam core 2, preferably 8 cells per 0.08 inch across the width of the foam core 2, is preferred. However, a broad range of from 5 to 25 cells per 0.08 inches can be employed. Generally, decreasing the average cell size increases the flexibility of the foam, such that at about 20 to 25 cells per 0.08 inch, the foam core of the present invention becomes flexible.

The Vicat softening points of the fiberglass-reinforced, styrene/maleic anhydride copolymer resins mentioned above are higher than about 250° F. so that the thermoformable composite article, according to the invention, will comply with the current and anticipated future specifications of automobile manufacturers regarding the acceptable heat deflection temperatures for headliners. In addition, the fiberglass-reinforced, styrene/maleic anhydride resins exhibit an advantageous combination of properties of high tensile and flexural modulus, high tensile and flexural strength, and improved fatigue resistance and impact resistance. Moreover, the fiberglass-reinforced, styrene/maleic anhydride resin exhibits reduced mold shrinkage, a lower coefficient of linear thermal expansion and a lower water absorption.

Specifically, the fiberglass-reinforced, styrene/maleic anhydride copolymer resins have a tensile strength of at least about 8,000 psi (ASTM B-638), a tensile elongation of less than about 3 percent (ASTM B-638), a tensile modulus of at least about 600,000 psi (ASTM B-368), a flexular strength of at least 12,000 psi (ASTM B-790), a flexular modulus of at least 500,000 psi (ASTM B-790) an Izod impact strength of at least 1.0 ft lbs/inch of notch (0.0125 inch specimen, ASTM B-256), a mold shrinkage of not more than about 0.003 inch/inch (ASTM D-955), a deflection temperature under load of at least 225° F. for a ⅛ inch bar, at 264 psi, unconditioned, and, when conditioned at 194° F., a deflection temperature of at least 230° F.

The flexibility or rigidity of the foam core 2 largely determines the structural properties of the resulting thermoformable composite article. Although the thermoformable composite article of the present invention can be relatively flexible, embodiments of the invention wherein the foam core is substantially rigid are particularly useful. If the composite article is to be used as an automotive headliner, the foam core 2 should not sag at temperatures of less than 240° F. In other words, the Vicat softening point of the resin used to make the foam core 2 should be higher than about 240° F., preferably higher than 250° F. Polystyrene foams generally do not have a sufficiently high softening point to pass such a sag test, but fiberglass-reinforced, styrene/maleic anhydride copolymer resins are capable of passing this test.

The composite article of the present invention is usually formed as a flat sheet or board.

The fabric layers 5 and 6 can be made from any suitable natural or synthetic fibers or fiber blends. Useful synthetic fibers include polyester, nylon and acrylic fibers. A nonwoven polyester fabric made of 1.5 to 25 denier polyester fibers is preferred. A fiber fineness range of from 1.5 to 10 denier improves the acoustic properties of the polyester fabric. The fabric layers 5 and 6 generally have a weight per unit area in the range of from 1 to 12 ounces per square yard, and a thickness in the range of from 0.1 to 0.8 inches. A comparison of FIGS. 1 and 2 shows that the thicknesses of the fabric layers 5 and 6 are reduced by the press bonding process used to form the thermoformable composite article. A preferred initial thickness range for the fabric layers 5 and 6 is from 0.25 to 0.5 inches.

The fabric layers 5 and 6 are previously impregnated with the uncrosslinked thermosetting resin or the thermoplastic resin before being brought into contact with and bonded to the foam core 2 as described above. Thermoplastic and thermosetting resins useful for this purpose include acrylics, styrenes, vinyl acetate, vinyl acetate-acrylics, phenolics and melamines. The impregnated fabrics can be prepared by dissolving the resin in a solvent and then treating the fabrics with the resin-solvent system by spraying, coating or the like. After the fabrics are thoroughly impregnated, the solvent is removed by drying. A preferred resin-solvent system is an ethylene-vinyl acetate copolymer dissolved in water. The weight ratio of resin solids to the weight of the fabric per unit area is desirably in the range of 1.2 to 3.2, especially about 1.1. It is generally useful to limit the total weight of the resin-impregnated fabric to a maximum of 16 ounces per square yard, particularly 5 to 8 ounces per square yard. A fire retardant, such as aluminum trihydrate, can be added to the resin solution so as to be incorporated into the fabric layers.

A thermosetting resin is most useful as the resin to be impregnated into the fabric layers 5 and 6. Such a thermosetting resin remains in the B-stage during the impregnation process and it is not actually cured until the composite thermoformable composite article is subsequently thermoformed. If a nonwoven fabric layer is used on only one side of the foam layer 2, the other fabric layer can be made of any type of fabric, woven or nonwoven, and need not be impregnated with the thermoplastic or thermosetting resin. Extensible paper can be used as the other fabric layer in such a case.

The adhesive layers 4 and 5 are made of a heat-activated glue effective to bond the resin-impregnated fabric layers 5 and 6 to the foam core 2. Any conventional, heat-activated adhesive which is compatible with the other components can be employed. Preferred adhesives for the layers 4 and 5 include acrylic and styrene-butadiene-type adhesives. The adhesive layers are applied according to conventional techniques to either the foam core 2 or the fabric layers 5 and 6 so that the foregoing components will be effectively bonded together when pressed together under heating.

The finished thermoformable composite article according to the present invention can be thermoformed by a procedure, such as the following. The thermoformable composite article is cut and shaped to a desired form, then preheated by stagewise preheating to temperatures of 150° F., 250° F. and finally, 300° F, as a maximum. The foam core 2 is softened and rendered flexible by such heating. The sheet is then placed in a cold (120° to 160° F.) die and then thermoformed.

FIGS. 3 and 4 show a second embodiment of the present invention wherein the foam core 2 of the thermoformable composite article 1B is subdivided into a pair of separate foam core layers 2A and 2B superposed directly on top of one another. The adhesive layer 10 is formed between the cores 2A and 2B. The adhesive layer 10 is essentially the same as the layers 3 and 4 but, unlike these layers, the layer 10 has a series of gaps therein, i.e., it is discontinuous. During thermoforming, a vacuum-forming method can be used to form voids or resonator chambers 7 within the composite material 1B, which chambers correspond to areas wherein no adhesive layer is present. In the case of an automobile headliner, the voids are large, roughly oval spaces formed at positions corresponding to compartments separated by roof stringers. The resulting headliner has an improved sound absorbing ability. A matrix region surrounds the void regions 7. In the matrix region, layers A and 2B are not substantially separated during the thermoforming step. FIG. 3a shows a modification of FIG. 3 in which a continuous adhesive layer 10C is formed between the foam core layers 2A and 2B.

FIGS. 5a, 5b, 6 and 7 show a composite article 1C according to a third embodiment of the present invention. In this embodiment, the separate foam core layers 2A and 2B have an additional fabric layer 9 and heat-activated adhesive layers 10A and 10B interposed therebetween. Referring to FIGS. 5a and 5b, the foam layers 2A and 2B, fabric 9 and adhesive layer 10B are laminated together in a press. The press platen contacts selected portions of the layer 2A and causes some of the adhesive in the outer portion of the adhesive layer 10B to migrate through the porous fabric 9 and form the adhesive 10A around the regions 7. In this embodiment, at least one of the fabric layers 5, 6 and 9 must be the nonwoven fabric layer impregnated with the thermoplastic or uncrosslinked thermosetting resin. Layer 10A is essentially the same as the layer 10 of the preceding embodiment of FIG. 3, and allows the void 7 to form between the foam core 2A and the fabric layer 9. If a void is not to be formed, in place of discontinuous adhesive layer 10A, there can be used a continuous layer like adhesive layer 10C in FIG. 3a. The adhesive layer 10B is a continuous layer essentially the same as the layers 3 and 4. The additional fabric layer 9 further increases the sound absorption capacity of the thermoformed composite article.

The invention will be further described with reference to an illustrative example.

EXAMPLE

A pair of nonwoven fabric layers made of Hoechst 90 polyester having a fiber fineness of 6 denier, a weight per unit area of 6 ounces per square yard, and a thickness of approximately = inch, were saturated with an ethylene-vinyl acetate copolymer emulsion (National Starch X-LINK 25-2802, 45 percent solids in water). The layers were then dried whereby a pair of thermosetting resin-impregnated polyester nonwoven layers were prepared. The dry layers were then each coated on one side of a layer of a polyvinyl chloride adhesive (HC-6990, a product of Pittsburgh Paint & Glass Company, Hughes Chemical Division, 55 percent total solids, 9.2 pounds per gallon).

A foam core was formed from a rigid foam of styrene/ maleic anhydride copolymer (Dylark 240-F10, a product of Arco Polymers, Inc.) by a conventional extrusion process. The foam core had a thickness of about 0.094 inches and was in the form of a flat slab. To form the coated fabric layers and the foam core into an integral unit, the foam core was interposed between the adhesive coated faces of the fabric layers and the resulting assembly was subjected to a laminating procedure. The assembly of the core and fabric layers was heated to 265° F. and bump-pressed by a pair of platens under a pressure of 50 tons per 25 square feet, for 10 seconds, whereby moisture was removed and the layers were effectively bonded to the foam and the fabric layers were effectively bonded to the foam core. During the lamination, the foam core underwent foaming and increased in thickness approximately 100 percent, to a final thickness of about 0.19 inches. The fabric layers were reduced in thickness and made more dense by the bonding process, such that the thickness of the bonded article, after cooling, was about 0.28 inches. After laminating, the thermoformable composite article was allowed to cool. In the finished thermoformable composite article, the foam core had a density of about 5 pounds per cubic foot and it consisted of closed cells, there being about 8 cells across the width of the foam core. The finished article was essentially a rigid board suitable for infrared thermoforming by heating to about 300° F.

Although particular preferred embodiments of the invention have been described, the invention contemplates such changes or modifications therein as fall within the scope of the following claims.

The embodiments of the present in which an exclusive property or privilege is claimed are defined as follows:

1. A thermoformable laminate comprising: a relatively stiff, thermoformable, synthetic resin, foam core containing from about 5 to about 30 percent by weight of relatively short, reinforcing, stable fibers uniformly distributed therein, said foam core having a Vicat softening point of at least 240° C. and a pair of fabric layers adhesively bonded to the foam core, at least one of said fabric layers being a nonwoven fabric impregnated with a thermoplastic or uncrosslinked thermosetting resin.

2. A laminate as claimed in claim 1 wherein said foam core has a Vicat softening temperature of from 250° C. to 270° C.

3. A laminate as claimed in claim 1 wherein said foam core consists essentially of styrene/maleic anhydride copolymer containing from 10 to 20 percent by weight of chopped fiberglass having a length in the range of from about 1/16 to about ½ inch.

4. A laminate as claimed in claim 1 wherein said one fabric layer consists essentially of nonwoven polyester fibers.

5. A thermoformable laminate as claimed in claim 1 wherein said core comprises a pair of cores of the fiber-reinforced, synthetic resin foam which layers are not bonded to each other in a plurality of spaced-apart regions and said layers are bonded to each other in the remaining regions thereof.

6. A thermoformable laminate as claimed in claim 1 wherein said foam core consists essentially of styrene/maleic anhydride copolymer.

7. A method of forming an automobile headliner which comprises thermoforming a laminate as claimed in claim 1.

8. A thermoformable laminate comprising: a relatively stiff, thermoformable, synthetic resin, foam core consisting essentially of styrene/maleic anhydride copolymer containing from 10 to 20 percent by weight of chopped fiberglass having a length in the range of from about 1/16 to about ½ inch uniformly dispersed therein, said foam core having a Vicat softening temperature of from 250° C. to 270° C. and a pair of fabric layers adhesively bonded to the foam core, at least one of the fabric layers being a nonwoven fabric consisting essentially of nonwoven polyester and impregnated with a thermoplastic or uncrosslinked thermosetting resin.

9. A thermoformable laminate as claimed in claim 8, wherein said core comprises a pair of cores of the fiber-reinforced, synthetic resin foam which layers are not bonded to each other in a plurality of spaced-apart regions and said layers are bonded to each other in the remaining regions thereof.

10. A method of forming an automobile headliner which comprises thermoforming a laminate as claimed in claim 8.

* * * * *

UNITED STATES PATENT AND TRADEMARK OFFICE
CERTIFICATE OF CORRECTION

PATENT NO. : 5 049 439
DATED : September 17, 1991
INVENTOR(S) : Leonard W. ROBINSON It is certified that error appears in the above-identified patent and that said Letters Patent is hereby corrected as shown below:

Column 4, line 24; change "square The" to ---square inch. The---.

Column 7, line 15; change "== inch" to ---1/8 inch---.

Signed and Sealed this

Twenty-fifth Day of May, 1993

Attest:

MICHAEL K. KIRK

Attesting Officer

Acting Commissioner of Patents and Trademarks